Figure 1:
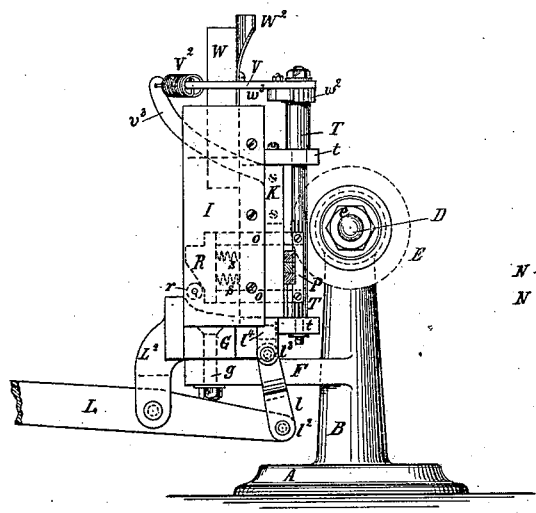

(No Model.)

A. S. GRANGER.
MACHINE FOR CUTTING TEETH OF RACK BARS.

No. 313,201. Patented Mar. 3, 1885.

Witnesses:
George F. Whitlock.
A. B. Stevens.

Inventor.
Albert S. Granger
by
Wm. G. Button,
Atty

UNITED STATES PATENT OFFICE.

ALBERT S. GRANGER, OF BROOKLYN, NEW YORK.

MACHINE FOR CUTTING TEETH OF RACK-BARS.

SPECIFICATION forming part of Letters Patent No. 313,201, dated March 3, 1885.

Application filed April 29, 1884. (No model.)

*To all whom it may concern:*

Be it known that I, ALBERT S. GRANGER, a citizen of the United States, residing at Brooklyn, in the county of Kings and State of New York, have invented certain new and useful Improvements in Machines for Cutting the Teeth of Racks, of which the following is a full and complete specification.

The machine consists of a cast-iron frame made up of a base-plate and two upright pillars carrying bearings for a revolving arbor to which is attached a toothed cutting-disk secured in the ordinary manner. Projecting from the front of the upright supports at right angles with the cutter-shaft and below the cutter are two horizontal arms upon which is bolted a horizontal bar, the bolts passing through slots in both arms and bar to allow adjustment in either direction. Back of and parallel with the horizontal bar first mentioned is bolted an L-shaped bar, the foot of the L projecting forward even with the front of the first-mentioned bar, in which is inserted a screw passing through the projection of the second bar, with jam-nuts on each side for the purpose of adjustment. To the end of the horizontal bar opposite the cutter is secured an upright block with a dovetailed vertical groove in which slides another block or table operated by a lever and stirrup underneath. The face of this sliding table next the cutter has a horizontal ledge upon which is placed the bar or bars of metal in which teeth are to be cut, held firmly by means of a spring. By the upward movement of the sliding table the bar to be cut is carried up past the center of the cutter, and a cut is made corresponding to the space between a pair of teeth. Passing through the sliding table are two rods sliding in holes in the block and carrying a vertical plate corresponding in thickness to the space between the teeth required to be cut, and at the side of the cutter opposite to that in which the bars to be cut are fed to the machine. These rods carry a cam-plate on their back ends, and the vertical plate is kept in the spaces between two teeth during the cutting-stroke by the retractive force of spiral or other springs. Upon the return-stroke, after the metal has been withdrawn clear of the cutter, the cam impinges upon a projecting stud secured to the frame of the machine, and the vertical plate is withdrawn from the space between the teeth, allowing the bar to be moved forward another space by means of a pinion engaging with the teeth already cut. On resuming the upward or cutting stroke the vertical plate slips into the space last cut, holding the bar firmly against the sliding table and securing uniformity in the teeth cut. The cutter is driven by power, and the bar to be cut is fed forward automatically by means of the pinion before mentioned.

The motion of the bar to be cut to and from the cutter may be effected by means of a hand-lever, or by suitable gearing driven by power.

Figure 2:
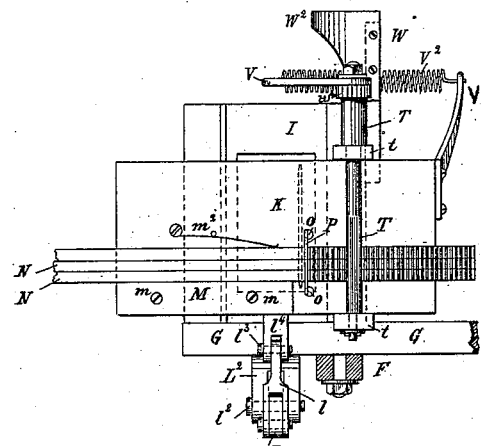
Figure 3:
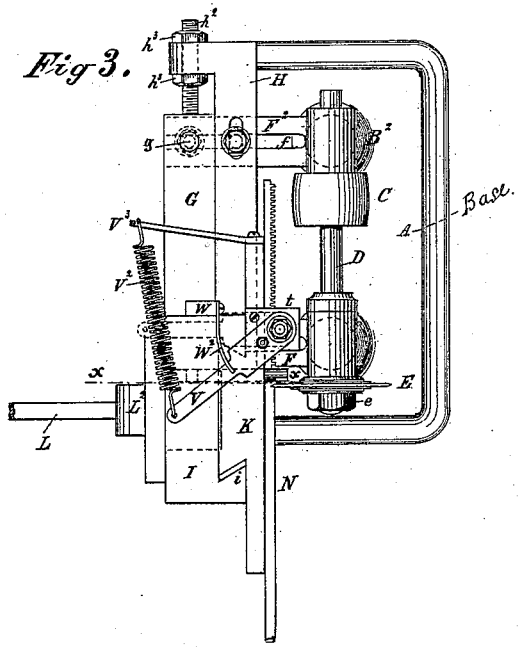
Figure 4:
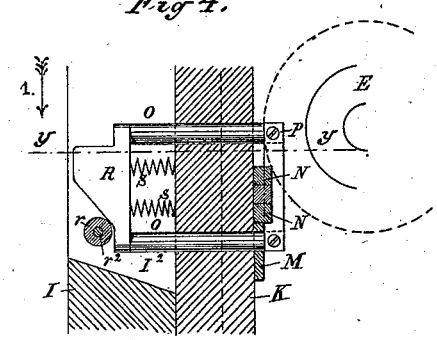
Figure 5:
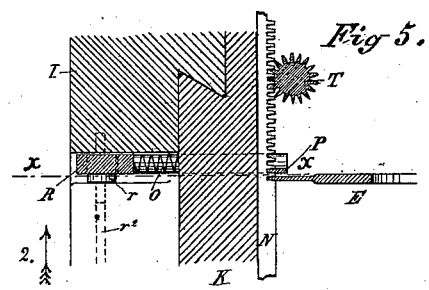

In the drawings, Figure 1 is an end elevation of the entire machine. Fig. 2 is a front elevation of the working parts of the machine. Fig. 3 is a plan view of the entire machine. Fig. 4 is a partial vertical section on the line $x\,x$ of Fig. 3. Fig. 5 is a partial horizontal section through $y\,y$ of Fig. 4.

Arrow No. 1 indicates the direction of the motion of the vertical sliding block.

Arrow No. 2 indicates the direction in which the bar to be cut is fed.

The same letters refer to similar parts throughout the several drawings.

A is the base-plate, to which are attached the uprights B B$^2$, from which project horizontal arms F F$^2$, slotted at $f$. At the top of these uprights, supported in suitable bearings, is the cutter-shaft D, driven by the pulley C and carrying the cutter-disk or special milling-tool E, secured by a nut, $e$. On the upper surface of the horizontal arms and resting upon them is the horizontal bar G, adjustably secured to them by the bolts $g$, passing through slots in both the bar and the supporting-arms. Immediately back of this bar and parallel with it is secured in the same manner a similar bar, H, with an L-shaped projection, through which passes loosely the screw $h^2$, attached to the bar G, and carrying on each side of the projection $h$ a jam-nut, $h^3$. On the other end of the horizontal bar G and in front of the cutter stands the upright block I, firmly secured to the bar G. On the face of this block toward the cutter is cut a vertical dovetailed groove, the side of which (indicated at $i$) is provided with a suitable gib and screw (not shown) to take up the wear. Sliding in this groove and reciprocated vertically by the lever L, fulcrumed to L², and attached to the block by the stirrup $l$ and the pins $l^2$ and $l^3$, is a block or table, K, dovetailed to fit the groove in the block I. To the outer face of this sliding table is secured by screws $m$ a ledge, M, upon which the bar or bars in which teeth are to be cut are placed and held firmly thereon by the spring $m^2$.

Passing through the table K and immediately inside the cutter are the horizontal rods $o$, in one vertical plane. On the inner end of these is fastened the vertical blade P, the edge of which corresponds to the groove made by the cutter. On the other end of these rods $o$, which project back through the sliding table into a mortise or recess, I², in the vertical block I, is attached a cam-plate, R. Between this cam-plate and the sliding table K are inserted suitable springs, S, which tend to draw the plate or blade P firmly against the metal rods N.

$r$ is a small stud, roller, or pin attached to the side of the recess I, for a purpose hereinafter described.

Passing through suitable bearings, $t$, at the top and bottom of the sliding table is the vertical revolving shaft T, which for some distance up from the bottom is fluted with suitable teeth corresponding to the rack to be cut.

V is a lever-arm working loosely on the upper end of the shaft T, and capable of turning it by means of the pawl $w^3$, acting upon the ratchet $w^2$.

To the outer end of the arm V is attached a spiral spring, V², the other end of which is secured to an arm, V³, projecting from the sliding table K. To the upright block I is attached a post, W, carrying the spiral cam W², against which the arm V presses during a portion of the upward movement of the table.

The operation of the machine is as follows: The bar or bars of metal to be cut are placed against the face of the sliding table K upon the ledge M and pushed endwise under the spring $m^2$, so that the ends abut against the blade or plate P. While held in this position the table K is moved upward against the cutter by means of the lever L until a transverse cut is made completely across the face of the bars, constituting the space between two teeth. On the downward movement of the table the metal is withdrawn from the cutter and the cam-plate R brought in contact with the roller or stud, compressing the springs S and forcing the bars $o$ forward, and with them the plate P, thus allowing the metal to be moved forward until the groove just cut is directly behind the blade P, which, on the commencement of the upward motion, is immediately drawn firmly into the said groove by the springs S holding the metal firmly in place, while the second cut is made in precisely the same manner as the first. After several teeth have been cut in this manner the first tooth comes in contact and engages with the pinion-shaft T, which, upon the downward movement of the table K, forcing forward the blade P and, releasing it from the groove, is rotated by the retractive force of the spring V², acting upon the arm V and ratchet and pawl $w^2$ $w^3$, thereby drawing the metal forward the requisite distance to allow the blade to drop into the groove last cut. On the returning upward movement the arm V is brought against the spiral cam W, and thereby swung around on the shaft, allowing the pawl to slip over and engage with another tooth on the ratchet corresponding to the required spacing between the teeth. The bar remains in this position until the blade P is again released, when the retractive force of the spring again draws the metal forward, as before described. Now, it is plain to be seen that the spacing of the teeth must correspond precisely to the distance between the centers of the edges of the cutter and the blade P, thus securing perfect uniformity in the spacing.

In order to vary the spacing of the teeth it is only necessary to adjust the bar G to the right or left by means of the screw $h^2$ and jam-nuts $h^3$, first loosening slightly the screw $g$. Suitable cutters for different sizes of teeth are required, as a matter of course. The depth of the cut can be varied by moving the bar G to or from the cutter, as required.

An unlimited length of rack can be cut by this machine perfectly uniform from end to end, and one or more pieces at the same time, according to size.

The machine may be placed so that the parts described as vertical are horizontal; but I have found the position shown most convenient.

Having now fully described my invention, what I claim, and desire to secure by Letters Patent, is—

1. In a machine for cutting the teeth of racks, the combination of a sliding table for supporting the bar to be cut with a rotary cutter, and a blade which is capable of being pressed between two teeth already cut, and withdrawn to allow of the bar being fed forward another space, substantially as shown and described.

2. In a machine for cutting the teeth of racks, the combination of a rotary cutter with a reciprocating carriage having a shelf for supporting the bar to be cut, and a pinion which gears with the teeth already cut in the rack, and acting to feed it forward by means of a lever-arm, pawl and ratchet, and cam-plate on carriage, substantially as set forth.

3. In a machine for cutting the teeth of racks, the combination of a blade automatically held in the space between two teeth and removed therefrom when the bar is fed forward, with a reciprocating carriage, a cam and pin for operating the blade, and a pinion-shaft gearing with the already-cut teeth of the rack and acting to feed it forward, the said pinion-shaft being operated by the reciprocating motion of the carriage by means of a cam-plate acting against a lever-arm connected by a pawl-and-ratchet movement with the aforementioned pinion-shaft, substantially as shown and described.

4. In a machine for cutting the teeth of racks, the combination of a spring and cam-actuated blade for securing the even spacing of the teeth by entering the groove or space last cut, with a reciprocating table upon which the metal to be cut is placed.

5. In a machine for cutting the teeth of racks, the combination of a blade which enters the space between two teeth, a rotary cutter, a reciprocating table for carrying the metal to be cut, and a toothed roller or pinion-shaft gearing with the teeth already cut and feeding the metal forward as required.

6. In a machine for cutting the teeth of racks, the combination of the blade P, the rods $o$ $o$, springs S, cam-plate R, and stud or roller $r$ $r^2$, affixed to the sliding table I.

7. The combination of the blade P, sliding table K, block I, cutter E, with the adjustable bar G and the fixed bar H, screw $h^2$, and jam-nuts $h^3$ $h^3$, substantially as described.

8. The combination of the pinion-shaft T, ratchet $w^2$, pawl $w^3$, lever V, spring $V^2$, arm $V^3$, and cam-plate $W^2$, all for the purpose of feeding forward automatically the metal to be cut, substantially as shown and described.

9. In a machine for cutting the teeth of racks, the combination of the cam-plate $W^2$, with the lever V, pawl $w^3$, ratchet-wheel $w^2$, and pinion-shaft T, substantially as shown and described.

10. The combination of the base A, supports B, shaft D, driving-pulley C, cutter E, guide I, reciprocating table K, adjustable plate G, and its accessory parts, blade P, cam-plate R, stud $r$, shelf M, pinion-shaft T, pawl $w^3$, ratchet $w^2$, lever V, and cam-plate $W^2$, operating substantially as shown and described.

In witness whereof I have hereunto set my hand.

ALBERT S. GRANGER.

Witnesses:
 JAMES F. DOYLE,
 NICHOLAS V. QUINN.